(12) United States Patent
McDonald et al.

(10) Patent No.: US 8,066,029 B2
(45) Date of Patent: Nov. 29, 2011

(54) PERSUASIVE ENVIRONMENTAL RECOVERY SYSTEM

(76) Inventors: William McDonald, Oceanside, CA (US); Walter L. Dabbs, Oceanside, CA (US); Paul Willman, Chino Hills, CA (US)

( * ) Notice: Subject to any disclaimer, the term of this patent is extended or adjusted under 35 U.S.C. 154(b) by 706 days.

(21) Appl. No.: 12/143,399

(22) Filed: Jun. 20, 2008

(65) Prior Publication Data

US 2009/0314351 A1 Dec. 24, 2009

(51) Int. Cl.
*F16K 21/18* (2006.01)

(52) U.S. Cl. ........ 137/386; 137/363; 137/558; 137/593; 405/37

(58) Field of Classification Search ................. 137/78.1, 137/363, 386, 558, 593; 405/37
See application file for complete search history.

(56) References Cited

U.S. PATENT DOCUMENTS

| | | | |
|---|---|---|---|
| 356,448 A * | 1/1887 | Clark | 137/448 |
| 4,150,683 A | 4/1979 | Simon | |
| 4,546,346 A | 10/1985 | Wave et al. | |
| 4,973,950 A | 11/1990 | Tourtillott | |
| 5,209,254 A * | 5/1993 | Ancselovics | 137/87.02 |
| 5,225,813 A * | 7/1993 | Raub, Sr. | 340/623 |
| 5,651,147 A | 7/1997 | Steele et al. | |
| 5,687,761 A | 11/1997 | Langes | |
| 6,311,721 B1 | 11/2001 | Aaron | |
| 6,443,091 B1 | 9/2002 | Matte | |
| 6,675,826 B1 * | 1/2004 | Newman et al. | 137/312 |
| 6,997,201 B2 | 2/2006 | Preul | |
| 2004/0003855 A1 | 1/2004 | Dees et al. | |
| 2004/0197922 A1 * | 10/2004 | Cooper | 436/52 |
| 2007/0028831 A1 | 2/2007 | Aniban | |
| 2007/0257218 A1 | 11/2007 | Bood et al. | |

FOREIGN PATENT DOCUMENTS

WO WO2005085774 9/2005

\* cited by examiner

*Primary Examiner* — Craig Schneider
(74) *Attorney, Agent, or Firm* — Novatech IP Law; Sean O'Neill

(57) ABSTRACT

A sewer backup alarm and overflow prevention device eliminates raw sewage spills by preventing pressure buildup in sewer drains. One or more sewage level sensors may be coupled to an alarm and/or to an automatic water main shut-off valve. The level sensor may detect excess fluid levels in a sewer lateral line. The sewer backup alarm and overflow prevention device may include a joggle which is a component of a non-mechanical backflow prevention device. The level sensor may detect fluid levels in the lower portion of the joggle and activate the automatic water main shut-off valve and/or the alarm. The sewer backup alarm and overflow prevention device may include at least one two-way, in-line cleanout tube which may extend vertically upwardly from the joggle. The level sensor may be mounted in the vertical cleanout tube. The components may be contained within a seamless polyethylene vault for ease of installation and protection against root intrusion.

17 Claims, 3 Drawing Sheets

PERSUASIVE ENVIRONMENTAL RECOVERY SYSTEM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND

1. Field

The presently disclosed embodiments relate generally to municipal sewer devices and, more specifically, to a lateral sewer line backup alarm and water main shutoff device.

2. Background

Throughout history, there has been a general awareness of the need to protect the natural environment. However, starting in the 1960's, environmental awareness increased and the general deterioration of the environment due to construction, pollution and pesticide use attracted greater public attention. Organizations emerged which were devoted solely to the restoration, preservation and conservation of the environment and management of natural resources.

Acts were passed such as the Clean Water Act of 1972 with the goal of eliminating water pollution and preserving surface waters for sport and recreation. Events in the 1980's such as the Exxon Valdez oil spill heightened public awareness of the fragility of the environment and the need for its protection. Amendments to the Clean Water Act were directed toward regulating the discharge of pollutants into surface waters.

Despite the increase in public awareness of the effects of pollution, the improper discharge of raw sewage into the environment continues. Such raw sewage may include wastewater from sinks, showers, bathtubs and washing machines as well as toilet wastewater carrying human waste. Modem sewer systems carry much of the raw sewage away through a system of pipes or conduits.

For residential dwellings, lateral sewer lines typically extend from each residential building to a larger conduit or sewer main that delivers the raw sewage to a sewage treatment plant. Lateral lines can become blocked due to improper disposal of non-soluble objects such as plastic items, baby wipes and feminine products. The buildup of grease and other items can also cause blockage of lateral lines. Roots growing into the lateral line can be another cause of clogging or blockage.

In conventional lateral line installations, a blockage or clog can prevent the outflow of wastewater to the sewer main. Unless removed, the blockage or clog will cause wastewater and sewage to back up into the residential building. Removal of the clog may be effectuated by inserting a flexible snake or cable into a vertically oriented cleanout riser or port that is typically located adjacent an exterior wall of the building. The cleanout port may be covered with a cap which is removed to allow insertion of the cable into the lateral line. The cable may include a cutting tool on the end to "rod out" the lateral line by cutting and removal of the object or material that is blocking the lateral line.

Unfortunately, if the clog is located downstream of the cleanout port, then wastewater and sewage may backup into the building interior prior to the owner becoming aware of the clog. During this time, the wastewater and sewage will also continue to buildup pressure inside the lateral line as sinks, showers and toilets inside the building are used. Upon removal of the cleanout cap to allow rodding of the lateral line, the raw sewage and wastewater may be discharged out of the cleanout port at a high rate where it then flows into the storm drain. As is well known, storm drains are intended to drain rainwater runoff from streets, sidewalks and roofs and are therefore typically not connected to a sewage treatment system. As such, raw domestic sewage that overflows a cleanout port during a rodding operation may enter a storm drain and may thereafter be discharged directly into a river, lagoon, reservoir, lake or into the ocean or other waterway.

The discharge of domestic raw sewage into the environment is a chronic source of pollution and is typically illegal. It is estimated that the amount of raw sewage that is released annually into the environment during sewer cleanouts is in the billions of gallons. As is well known, raw sewage poses a serious health risk due to the buildup of dangerous levels of bacteria in waterways that may be used for domestic purposes such as a supply for drinking and wash water or for recreational purposes such as swimming and surfing. Damage to the environment as a result of the discharge of raw sewage into waterways include fish kills and harm to local microecosystems such as micro-flora and fauna.

Attempts have been made to develop systems capable of detecting and removing blockages that may otherwise cause sewage backups inside buildings and prevent the discharge of raw sewage into the environment. For example, U.S. Patent Application No. 20070028831 to Aniban discloses a sewer cleanout cap having a sensor mounted on a cap housing. In one embodiment, the cleanout cap includes a popup mechanism to visually indicate a backup in a sewer system. The popup mechanism is activated by pressure buildup in the sewer line. The cleanout cap further includes a circumferential seal which, under pressure from rising sewer waters, prevents the escape of sewer waters from the sewer cleanout.

U.S. Patent Application No. 20070257218 to Bood et al. discloses a one-way backflow preventing device having a one-way seal with a membrane. The membrane is configured to deform slightly to allow flow in one direction after which the membrane returns to its original shape such that flow in the opposite direction is prevented. The device may be fluidly installed between a sewer main and various sanitary appliances such as sinks, toilets, bidets, urinals, baths pools and other appliances as a replacement for conventional water traps.

U.S. Pat. No. 4,150,683 to Simon discloses a system for controlling the flow of surface water from catch basins into a combined sewer as well as eliminating the overflow of combined sewers into streams and lakes and the backup of sewage into residential units. The system prevents overflow of combined sewers by adjusting the size of the pipe interconnecting the lateral lines to the catch basin.

U.S. Pat. No. 4,546,346 to Wave et al. discloses a sewer line backup detection device and alarm which is adapted to be installed in a cleanout port. The device includes a pneumatic switch that is activated by a flexible diaphragm on the lower end of the device housing. A blockage in the sewer line exerts pressure on the flexible diaphragm causing the pneumatic switch to close and setting off the alarm. The alarm can be either local or remote such as at a dwelling from which the sewer line exhausts. The device may be used in combination with a detention tank located in a basement of a high-rise building such that a blockage causes the alarm to be issued such that upper level users of the high-rise building may avoid using the sewer system to prevent overflow damage to lower levels.

U.S. Pat. No. 4,973,950 to Tourtillott discloses a sewer blockage alarm for a sewer line having a pressure sensor. The pressure sensor may be mounted on top of a clean out branch which extends upwardly from the sewer line. A pressure bell is mounted above an open upper side of the sewer line. The pressure bell is connected to the pressure sensor and multiplies the pressure changes in the sewer line for accurate detection of an incipient clog so that an alarm may be triggered prior to an overflow condition. The alarm may be visual and/or audible such as by using an alarm light and/or a buzzer.

U.S. Pat. No. 5,651,147 to Steele et al. discloses a three-way elbow for installation between a water trap and a wastewater line. The three-way elbow includes a valve having a hose extending upwardly therefrom with a removable plug inserted into an open end of the hose. Upon occurrence of a clog, the plug is removed, the valve is opened, and a snake is inserted into the hose. The arrangement of the three-way valve permits extension of the snake directly into the wastewater line to clear the clog after which the snake is withdrawn, the valve is closed and the plug is installed back onto the hose.

U.S. Pat. No. 5,687,761 to Langes discloses a sewer lateral line cleanout device adapted to be mounted on a cleanout riser of a sewer lateral. The cleanout device includes a vertically movable piston portion having a float member that rises under pressure from a backup in the sewer. The rising float member exposes a brightly colored wall that provides a visual indication of an impending sewer backup.

U.S. Pat. No. 6,311,721 to Aaron discloses a backflow stop plug adapted to be removably inserted between a junction of a residential sewer line and a sewer main. The backflow stop plug is adapted to prevent the backflow of sewage into the residence. The stop plug may be mounted on a rod having a turn handle for manually moving the stop plug into position. The plug is sized such that when compressed, the plug deforms to allow sealing around any debris and or sewage deposits located within the junction.

U.S. Pat. No. 6,443,091 to Matte discloses a drain alert detection device for detecting an overflow condition of a wastewater drain system as may be mounted on a household appliance such as a washing machine. The device includes an overflow conduit that is connected to an overflow detection mechanism having a vessel with a buoyant member contained therewithin. The buoyant member includes an overflow indicator which provides a visual indication of the extent of the overflow condition in proportion to the wastewater level in the vessel.

U.S. Pat. No. 6,997,201 to Preul discloses a wastewater control system for installation between a building sewer line and a sewer main. The control system includes a flow control device mounted in the building sewer line and further includes a hydraulic sensor and an actuator. When triggered by the hydraulic sensor, the actuator causes the flow control device to block the flow of wastewater from the building to the sewer main.

However, none of the above-referenced systems are understood to provide the combined capabilities of detecting a clog or blockage in the lateral sewer line prior to backup into the residence and shutting off the main water supply to prevent buildup of pressure in the lateral line and accidental discharge of raw sewage/wastewater from the cleanout port into the environment.

BRIEF SUMMARY

Embodiments disclosed herein address the above-stated deficiencies of the prior art by providing a Persuasive Environmental Recovery System (PERS) having a sensing device to detect sewage level changes and which may be linked to an automatic water main shut-off valve and/or alarm. In one aspect, a system for preventing raw sewage spills comprises at least one sensor, a water main line shutoff valve and/or an alarm. The sensor is configured to detect excess fluid levels in a sewer lateral line.

The water main line shutoff valve is communicatively coupled to the sensor for preventing water flow to a residence or building when the sensor detects an excess fluid level. The alarm is communicatively coupled to the sensor and is activated when the sensor detects an excess fluid level.

In another aspect, a method for preventing raw sewage spills comprises detecting excess fluid levels in the sewer lateral line and closing the valve in the water main line.

BRIEF DESCRIPTION OF THE DRAWINGS

The features and nature of the present invention will become more apparent from the detailed description set forth below when taken in conjunction with the drawings in which like reference numerals identify like parts throughout and wherein.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

The Persuasive Environmental Recovery System (PERS) sewer backup alarm and overflow prevention device eliminates domestic sewage overflows at homes, businesses or any other type of building utilizing sewer lines. Such sewage overflows may occur as a result of pressure buildup when a sewer lateral line becomes blocked.

Typically, when a sewer lateral line becomes blocked between a building and a sewer main connection at the street, unaware occupants may continue to use water until sewage backs up in a bath tub, sink, basement drain, or other plumbing apparatus. This backup creates pressure in the sewer lateral line system wherein the lateral line must be cleared with blockages or clogs removed. Unfortunately, opening of the cleanout port during cleaning and blockage removal causes the release of built up pressure resulting in raw sewage spills into the environment.

The sewer backup alarm and overflow prevention device disclosed herein eliminates these sewage spills by preventing pressure buildup in the lateral sewer line and overflow of raw sewage and wastewater through a cleanout port. A sewage level sensing device (i.e., sensor) may be coupled to an alarm and/or to an automatic water main shut-off valve to prevent overflow and backup. The sewer backup alarm and overflow prevention device may optionally include a pair of the cleanout ports, a strategically placed substance detector and a sewer test valve that may be insertable in the sewer lateral line. In one embodiment, any or all of these components may be fully encased in a seamless vault for ease of installation and protection against root intrusion.

Figure 1:
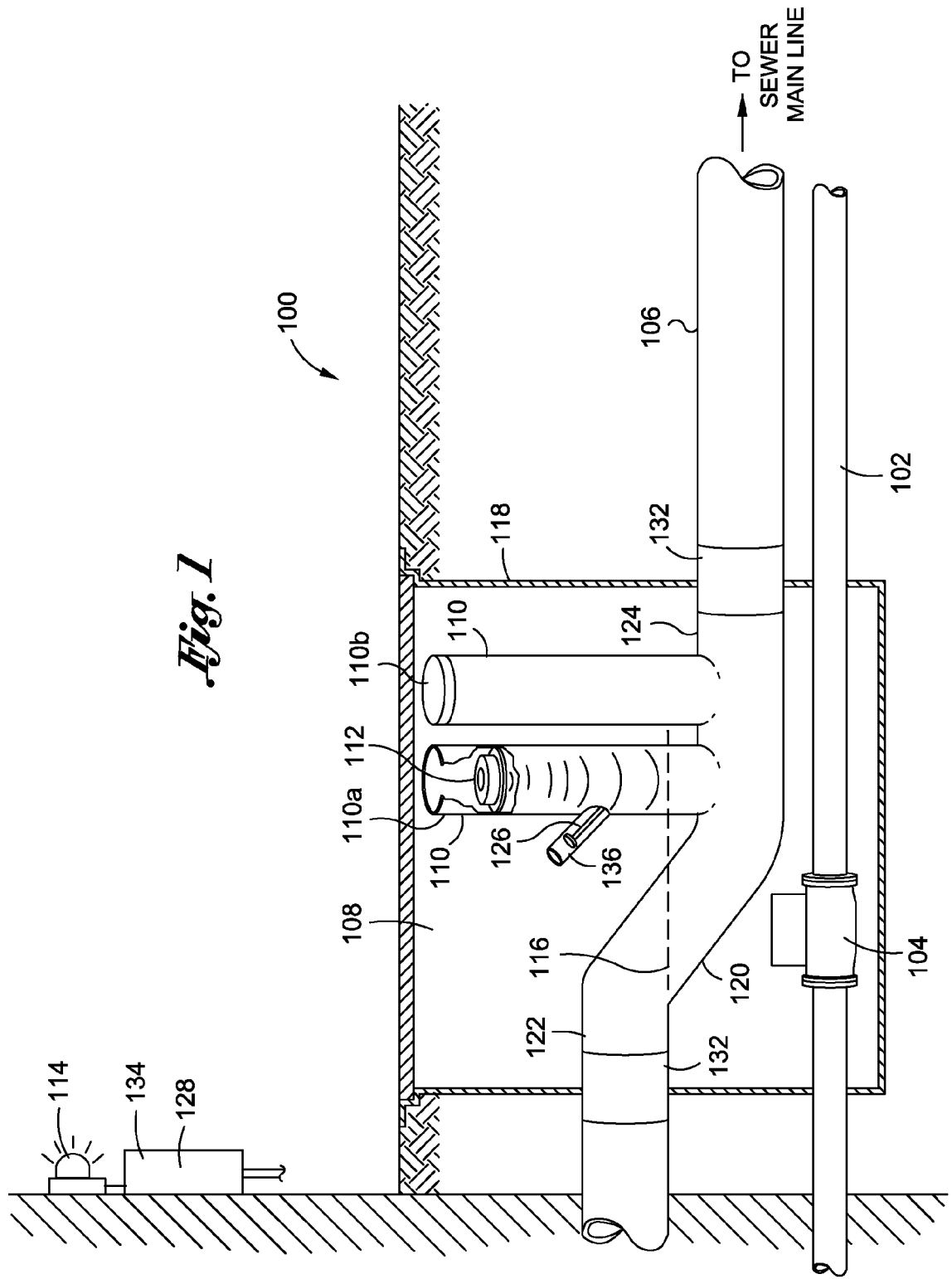
FIG. 1 is a side elevational view of an exemplary Persuasive Environmental Recovery System sewer backup alarm and overflow prevention device.

FIG. 1 is a side elevational view of an exemplary residential sewer system 100 into which may be installed a sewer backup alarm and overflow prevention device 108. In the residential sewer system 100, treated water may be provided from a municipal water source to a home (i.e., residence) or business through a water main line 102 when water main valve 104 is open. Wastewater and/or sewage may be returned to a sewage treatment center through a sewer main line (not shown) typically located under a street adjacent the building.

The sewer backup alarm and overflow prevention device 108 may comprise at least one vertical cleanout port or tube 110 or a set of two or more of the vertical tubes 110 mounted adjacent a joggle 120 formed in the sewer lateral line 106. The joggle 120 and sewer lateral line 106 collectively form a non-mechanical backflow prevention device. The joggle 120 may separate upper and lower portions 122, 124 of the sewer lateral line 106. Preferably, the joggle 120 is configured such that the offset between the lower portion 124 and the upper portion 122 of the sewer lateral line 106 is approximately equivalent to a height (e.g., a diameter) of the sewer lateral line 106. In another embodiment, the joggle 120 is such that an upper side of the interior of the lower portion 124 of the sewer lateral line 106 is no higher than a lower side of the interior of the upper portion 122 of the sewer lateral line 106.

As shown in FIG. 1, the vertical tubes 110 may preferably be mounted on a lower portion 124 of the sewer lateral line 106. At least one of the vertical tubes 110 of each set may comprise a level sensor 112 for detecting fluid or water levels such as wastewater or raw sewage levels in the sewer lateral line 106. In one embodiment, the level sensor 112 may be configured as a sonar-based fluid level sensor and may be mounted on an upper end of the tube 110 as shown in FIG. 1 although the level sensor 112 may be mounted at any location along the vertical tube 110.

Figure 2:
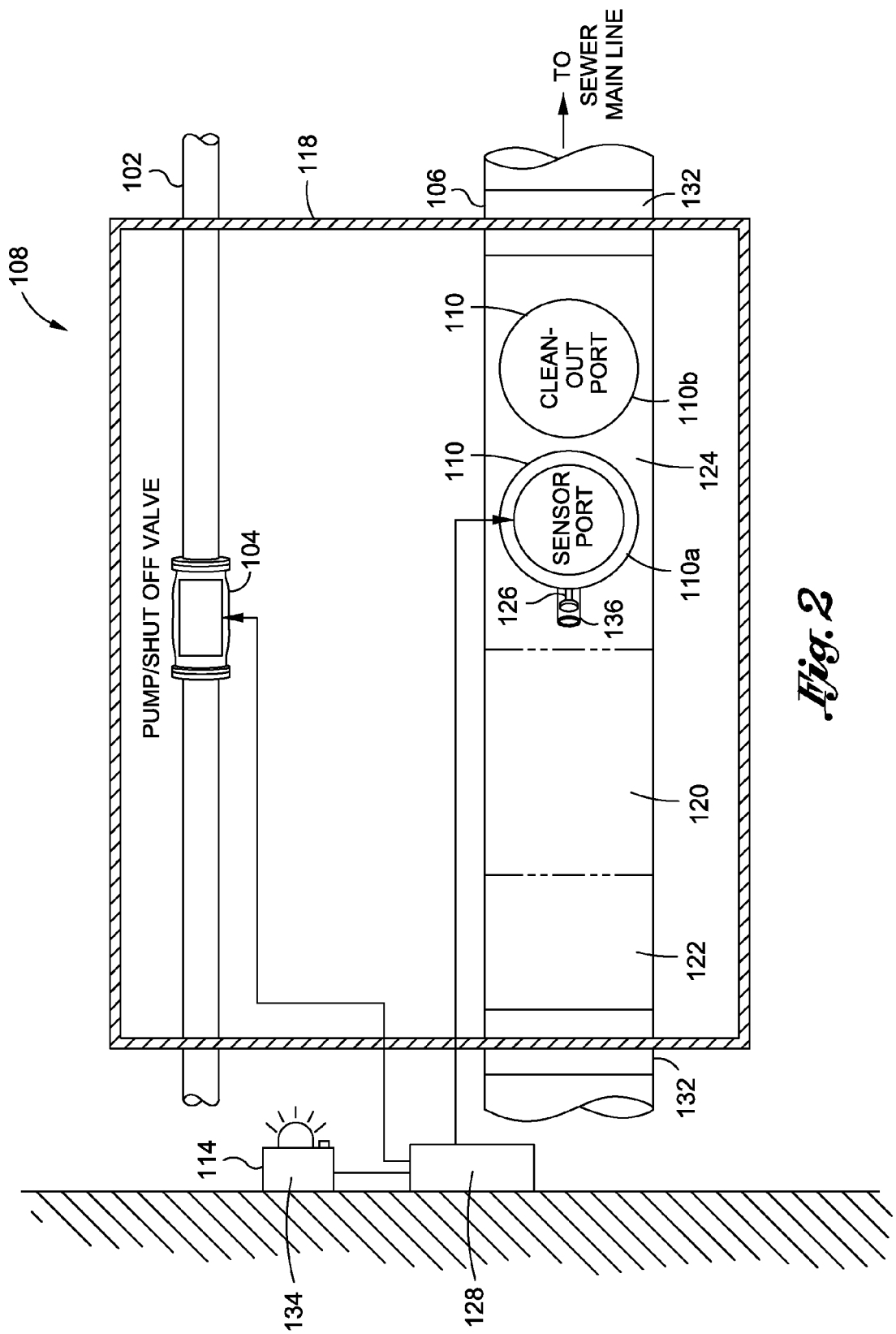
FIG. 2 is a top sectional view of an exemplary Persuasive Environmental Recovery System sewer backup alarm and overflow prevention device.

As shown in FIGS. 1 and 2, the sonar-based level sensor 112 may be similar to that which is commercially known as an Echopod Level Sensor and which is available from Flowline Liquid Intelligence of Los Alamitos, Calif. The Echopod may be used to detect fluid levels and may be of the type that is used in refineries to determine if fluid levels are at point where an explosion could occur due to a buildup of gasses. The sonar-based level sensor 112 may be configured to convert a sonar signal to an electrical signal (e.g., milli-Volt signal) which may be communicatively transmitted to an alarm 114 and water main valve 104. The level sensor 112 may be coupled to the alarm 114 and water main valve 104 by hard wiring, phone line, wireless signal, satellite, infrared, ultra sound or any other appropriate method.

Other configurations of the level sensor 112 are contemplated. For example, the level sensor 112 may be configured as a series of vertically-spaced submersible pressure transducers for detecting pressure and, hence, fluid level 116 along a variety of different depth ranges in the sewer lateral line 106. The level sensor 112 may further be configured in any one of a variety of different sensing mechanisms adapted to sense the level of fluid 116 within the sewer lateral line 106. In this regard, the level sensor 112 may include a mechanically-actuated switch that is operated by magnetic, mechanical, cable, and other float level sensors means which are configured to open or close the mechanical switch. The mechanical switch may be actuated by direct contact with the switch or via magnetic operation.

The alarm 114 may be configured as any visible, audible, silently-reporting, bell, whistle, siren or flashing alert, or any combination thereof. The alarm 114 may comprise a controller 134 for receiving signals from the level sensor 112, operating the alarm 114 alerts and controlling external communications with appropriate government or private agencies during the event of a blockage. The controller 134 may be processor-based and/or comprise a modem, wireless modem, radio or any other means for external communication. The controller 134 may comprise, or be coupled to, memory having stored program instructions for receiving signals from the level sensor 112, closing the water main shutoff valve 104, generating external communications and/or executing other user applications executable by the processor.

In one embodiment, the level sensor 112 may be mounted in sensor port tube 110a such as on an upper end thereof although the level sensor 112 may be mounted at any location along the tube 110a. The level sensor 112 activates the alarm 114 and initiates the closing of the water main valve 104 when the fluid level 116 in the sewer lateral line 106 reaches the lower-most side of the interior of the upper portion 122 of sewer lateral line 106. However, the level sensor 112 can be programmed to activate the alarm 114 or to shutoff the water main shutoff valve 104 for any fluid level 116 location.

The cleanout port tube 110b is preferably configured to provide access for locating and removing blockages in the sewer lateral line 106. In this regard, following notification of a blockage by the alarm 114, a cap covering the cleanout port tube may be removed and a flexible snake or cable (not shown) may be inserted into the cleanout port tube 110b. The cable may include a cutting tool on the end to "rod out" the sewer lateral line 106 by cutting and removal of the object or material that is blocking the sewer lateral line 106.

The water main shutoff valve 104, when closed, prevents water from reaching faucets, washing machines, toilets and other plumbing in the building. Because water cannot enter the building through the water main line 102, it cannot be returned through the sewer lateral line 106, thus preventing pressure buildup in the sewer lateral line 106. The level sensor 112 may also activate external communications to technicians or service personnel and may alert appropriate government or private agencies of a blockage and the need for service.

The sewer backup alarm and overflow prevention device 108 may optionally comprise a sewer test valve (not shown) for blocking the flow of water from the building to the main sewer line 106. The sewer test valve may be inserted into the cleanout port tube 110b to allow for temporary shut off of the flow of water through the sewer lateral line 106 while the system is tested or inspected to determine the location of the blockage. In one embodiment, the sewer test valve may be similar to that which is commercially known as a Test-Eze Test Gate and which is available from Mainline Backflow Products of Edmonton, Alberta, Canada.

In another embodiment of the sewer backup alarm and overflow prevention device 108, two sets of tubes 110, each set having a level sensor 112, are located in different portions of the lateral sewer lateral line 106. Preferably, the tubes 110 are located on the lower portion 124 and enable removal of a clog on an upstream or downstream side of the tubes 110. In other embodiments, any configuration, or number, of tubes 110 and tube locations may be implemented without departing from the scope of the invention.

Referring to FIGS. 1 and 2, in a further embodiment, it is contemplated that an additional sensor configured as a substance detector 126 may be implemented in the sewer backup alarm and overflow prevention device 108. For example, the substance detector 126 may be inserted into test port 136 which may optionally be formed with the tube 110a. The substance detector 126 may be configured to detect the presence of predetermined substances such as chemicals or other foreign or illegal substances contained within the wastewater flowing in the sewer lateral line 106. In addition, the substance detector may be configured to detect vapors and combustibles. Upon detection of certain predetermined substances, the substance detector 126 may be configured to cause an alarm to be sent to appropriate personnel and/or to cause the water main shutoff valve 104 to be activated into the closed position. In this regard, the substance detector 126 may be configured to detect methamphetamine labs by identifying target chemicals that are being outgassed during the cooking process. Fire departments, emergency services, law enforcement and the EPA may have an interest in detecting such chemicals.

The substance detector 126 may be mounted in an optional test port 136 extending from the sensor port tube 110a at an angle and being adapted for detecting substances in wastewater flowing from the home or business. The substance detector 126 mounted in the angled test port 136 may detect vapors, chemicals, combustibles, or other substances. If so detected, the system 108 can be configured to automatically report the detected substances to appropriate personnel through the alarm panel 128.

Figure 3:
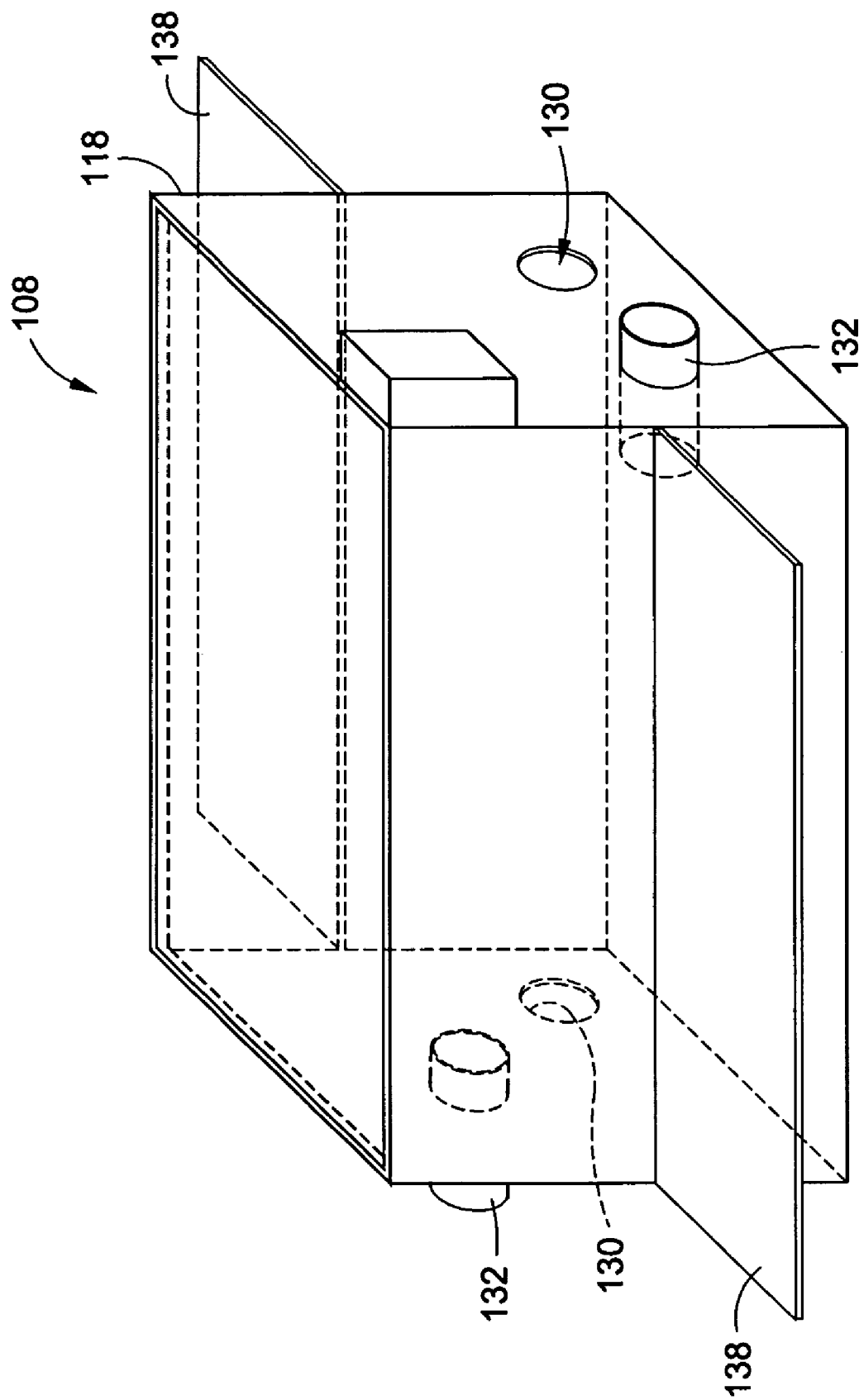
FIG. 3 illustrates an exemplary vault enclosure for the Persuasive Environmental Recovery System sewer backup alarm and overflow prevention device.

The sewer backup alarm and overflow prevention device 108 may be housed in a casing or vault enclosure 118 for ease of installation and protection against root intrusion. In one embodiment, the vault enclosure 118 comprises a seamless polyethylene vault although any material may be used to construct the vault. The vault enclosure 118 is easily retrofittable to existing homes or installed in new homes or commercial buildings. Furthermore, the vault enclosure 118 may be configured in a variety of shapes, sizes and configurations and is not limited to the configuration shown in the figures. For example, as shown in FIG. 3, the vault enclosure 118 may include at least one and, more preferably, a pair of fins 138 which may be mounted on exterior sides of the vault enclosure 118 to prevent floating (i.e., vertical and/or horizontal movement) of the vault enclosure 118 as may occur if groundwater or other water generates pressure underneath the vault enclosure 118. The fins 138 may be generally horizontally oriented as shown in FIG. 3 but may be formed in any suitable orientation (e.g. vertical or angles), shape, size or configuration.

Another embodiment of the sewer backup alarm and overflow prevention device 108 for high rise or multi-level buildings comprises the level sensor 112 installed on each floor for detecting an overflow condition on that floor. All level sensors 112 for the multi-level building may be communicatively coupled to one or more alarm panel 128 and one vault containing the tubes 110 for each sewer outlet from that building.

FIG. 2 is a top sectional view of the exemplary sewer backup alarm and overflow prevention device 108. Sensor port tube 110a, having level sensor 112 mounted therein, and cleanout port tube 110b, extend vertically from sewer lateral line 106. Level sensor 112 is communicatively coupled to water main shutoff valve 104 installed in the water main line 102 and the alarm 114 as detailed in FIG. 1. The tubes 110 and water main shutoff valve 104 may be encased in vault enclosure 118. In another embodiment, the water main shutoff valve 104 and water main line 102 may be located outside of the vault enclosure 118.

FIG. 3 illustrates an exemplary embodiment of a detailed view of a vault enclosure 118 for the sewer backup alarm and overflow prevention device 108. Vault enclosure 118 may optionally comprises fittings 130 or openings for connection to water main line 102 and fittings 132 or openings for connection to the sewer lateral line 106. Vault enclosure 118 may be a seamless or hermetically sealed unit. In another embodiment, vault enclosure 118 comprises two chambers separated be a vertical middle divider (not shown) wherein a pneumatic, electric or other type of valve and/or pump combination may drain the vault enclosure 118 in the event one chamber fills with water or fluid.

Thus, a novel and improved method and apparatus for a sewer backup alarm and overflow prevention device 100 has been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in the controller 134, alarm panel 128, or vault enclosure 118. In the alternative, the processor and the storage medium may reside as discrete components in the controller 134, alarm panel 128, or vault enclosure 118.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for preventing raw sewage spills comprising the steps of:

detecting fluid levels in a sewer lateral line having upper and lower portions, each one of the upper and lower portions having an end, the end of the upper portion of the sewer lateral line being vertically offset from the end of the lower portion of the sewer lateral line, the ends of the upper and lower portions of the sewer lateral line being fluidly coupled by a joggle having opposing ends, the joggle extending between the ends of the upper and lower portions of the sewer lateral line;

sensing the fluid levels using a sensor mounted in a sensor port tube extending upwardly from the an upper side of the lower portion of the sewer lateral line; and closing a valve in the water main line when excess fluid levels are detected in the sewer lateral line.

2. The method of claim 1 further comprising the step of: activating external communications when excess fluid levels are detected.

3. The method of claim 1 further comprising the step of: detecting substances in the fluid.

4. The method of claim 2 further comprising the step of: closing the valve in the water main line when substances are detected.

5. A system for preventing raw sewage spills comprising:
at least one sensor for detecting excess fluid levels in a sewer lateral line having upper and lower portions being vertically offset from one another, each one of the upper and lower portions having an end;

a joggle having opposing ends and fluidly coupling the end of the lower portion of the sewer lateral line to the end of the upper portion of the sewer lateral line, the joggle extending between the ends of the upper and lower portions of the sewer lateral line;

a sensor port tube extending upwardly from an upper side of the lower portion of the sewer lateral line, the sensor being mounted in the sensor port tube;

a water main line shutoff valve fluidly coupled to a water main line, the water main line shutoff valve being communicatively coupled to the at least one sensor and being configured to prevent fluid flow through the sewer lateral line when the at least one sensor detects an excess fluid level in the sewer lateral line.

6. The system of claim 1 wherein the ends of the upper and lower portions are vertically offset by an amount that is approximately equivalent to a height of the sewer lateral line.

7. The system of claim 1 wherein the joggle is configured such that an upper-most side of an interior of the lower portion is no higher than a lower-most side of an interior of the upper portion.

8. The system of claim 1 wherein the at least one sensor is sonar-based.

9. The system of claim 1 wherein the at least one sensor activates external communications when excess fluid levels are detected.

10. The system of claim 1 further comprising a vault enclosure for housing at least one of the sensor and at least a portion of the sewer lateral line.

11. The system of claim 1 further comprising a vault enclosure for housing at least a portion of the water main line.

12. The system of claim 5 further comprising:
an alarm communicatively coupled to the at least one sensor, wherein the alarm is activated when the at least one sensor detects the excess fluid level.

13. The system of claim 12 wherein:
the alarm is activated when the sensor detects that the fluid level reaches a lower-most side of the upper portion.

14. The system of claim 12 wherein the alarm comprises a controller, the controller being configured to perform at least one of the following functions: receive signals from the at least one sensor, operate the alarm, control external communications.

15. The system of claim 14 wherein the controller further comprises:
at least one of a processor and a memory having stored program instructions for performing at least one of the following:
receiving signals from the at least one sensor;
closing the water main shutoff valve;
generating external communications.

16. The system of claim 1 further comprising at least one substance detector for detecting at least one of vapors, chemicals, combustibles.

17. The system of claim 16 wherein the substance detector is mounted in a test port.

* * * * *